US012191057B2

(12) United States Patent
McManus et al.

(10) Patent No.: US 12,191,057 B2
(45) Date of Patent: Jan. 7, 2025

(54) NEGATIVE TEMPERATURE COEFFICIENT (NTC) THERMISTORS UTILISING TRANSITION METAL DICHALCOGENIDE QUANTUM DOTS

(71) Applicant: Nanoco 2D Materials Limited, Cheshire (GB)

(72) Inventors: Daryl Patrick McManus, Cheshire (GB); Steven Matthew Daniels, Derbyshire (GB)

(73) Assignee: Nanoco 2D Materials Limited, Runcorn (GB)

( * ) Notice: Subject to any disclaimer, the term of this patent is extended or adjusted under 35 U.S.C. 154(b) by 324 days.

(21) Appl. No.: 17/996,560

(22) PCT Filed: Apr. 21, 2021

(86) PCT No.: PCT/GB2021/050959
§ 371 (c)(1),
(2) Date: Oct. 19, 2022

(87) PCT Pub. No.: WO2021/214461
PCT Pub. Date: Oct. 28, 2021

(65) Prior Publication Data

US 2023/0207161 A1 Jun. 29, 2023

Related U.S. Application Data

(60) Provisional application No. 63/013,853, filed on Apr. 22, 2020.

(51) Int. Cl.
*H01C 7/04* (2006.01)
*H01C 1/02* (2006.01)

(52) U.S. Cl.
CPC ............... *H01C 7/041* (2013.01); *H01C 1/02* (2013.01)

(58) Field of Classification Search
CPC ................................. H01C 7/041; H01C 1/02
See application file for complete search history.

(56) References Cited

U.S. PATENT DOCUMENTS

| | | | |
|---|---|---|---|
| 3,465,278 | A | 9/1969 | Kern et al. |
| 7,245,479 | B2 | 7/2007 | Kobayashi et al. |
| 2013/0203201 | A1 | 8/2013 | Britton et al. |

(Continued)

FOREIGN PATENT DOCUMENTS

KR 20150026270 A 3/2015

OTHER PUBLICATIONS

International Search Report and Written Opinion issued in related PCT application PCT/GB2021/050959, mailed Aug. 10, 2021 (12 pages).

(Continued)

*Primary Examiner* — Kyung S Lee
(74) *Attorney, Agent, or Firm* — Blank Rome LLP

(57) ABSTRACT

Solution-processed negative temperature coefficient (NTC) thermistor devices include transition metal dichalcogenide (TMDC) quantum dots. The TMDC quantum dots may be formulated into an ink, and the ink may subsequently be deposited on a substrate and processed to form an NTC thermistor. Solution-processed NTC thermistors may be incorporated into RFID tags or as circuit protectors into electronic circuits.

17 Claims, 12 Drawing Sheets

(56) References Cited

U.S. PATENT DOCUMENTS

2018/0327618 A1 11/2018 Mcmanus
2019/0097014 A1* 3/2019 Lee .................. H01L 29/66742

OTHER PUBLICATIONS

Huang et al., "Flexible Miniaturized Nickel Oxide Thermistor Arrays via Inkjet Printing Technology", ACS Appl. Mater. Interfaces 2013, 5, 12954-12959 (6 pages).
"Thermistor Manufacturing Process", Littlefuse Technical Center, Littelfuse, Inc., Chicago, USA, downloaded from https://www.littelfuse.com/technical-resources/technical-centers/temperature-sensors/thermistor-info.aspx, Apr. 21, 2020 (3 pages).
"TDK technical guide: How to Use Temperature Protection Devices: Chip NTC Thermistors", TDK Tech, Apr. 16, 2018, downloaded from https://passive-components.eu/tdk-technical-guide-how-to-use-temperature-protection-devices-chip-htc-thermistors/ (9 pages).
Katerinopoulou et al., "Large-Area All-Printed Temperature Sensing Surfaces Using Novel Composite Thermistor Materials", Adv. Electron. Mater. 2019, 5, 1800605 (7 pages).
Sehrawat et al., "An ultrafast quantum thermometer from graphene quantum dots", Nanoscale Adv., The Royal Society of Chemistry 2019, DOI: 10.1039/c8na00361k (12 pages).
Nakajima et al., "Highly stable flexible thermistor properties of spinel Mn-Co-Ni oxide films on silver/carbon micro-binecone array composite electrodes", Journal of Applied Physics 122, 135309 (2017); doi: 10.1063/1.4994572 (9 bages).
Servati et al., "Novel Flexible Wearable Sensor Materials and Signal Processing for Vital Sign and Human Activity Monitoring", Sensors, 2017, 17, 1622; doi: 10.3390/s17071622 (20 pages).

* cited by examiner

NEGATIVE TEMPERATURE COEFFICIENT (NTC) THERMISTORS UTILISING TRANSITION METAL DICHALCOGENIDE QUANTUM DOTS

CROSS-REFERENCE TO RELATED APPLICATIONS

This application is a national stage of International Patent Application No. PCT/GB2021/050959 filed Apr. 21, 2021, which claims the benefit of U.S. Provisional Application No. 63/013,853 filed Apr. 22, 2020, the entire contents of which are incorporated by reference herein.

BACKGROUND OF THE INVENTION

1. Field of the Invention

The invention relates to negative temperature coefficient (NTC) thermistors. More particularly, the invention relates to the solution processing of NTC thermistors using quantum dots.

2. Description of the Related Art Including Information Disclosed Under 37 CFR 1.97 and 1.98

The accurate measurement of temperature is of key importance in many aspects of daily life. Uses of temperature sensors range from industrial processes, to household appliances such as kettles and toasters, to automotive applications. Traditionally, thermocouples have been used to measure temperature. In a thermocouple, changes in the resistance of a metal are used to measure the temperature. However, their precision is limited. Temperature can also be measured using resistance temperature detectors (RTDs), which are typically made from noble metals that have a stable resistance change over a wide temperature range. They are highly accurate, yet the sensitivity is normally low (+0.1% ° C.$^{-1}$). Positive temperature coefficient (PTC) composites provide an alternative technology. The resistance of PTC thermistors increases as the temperature rises. They usually consist of a conductive filler, such as carbon or nickel, and a polymer binder, such as polyethylene. During heating, the composite undergoes a phase transition around the melting point of the polymer binder. This results in a change in resistance of an order of magnitude. However, PTC thermistors typically suffer from poor stability and retention of the initial resistance under cycling.

Negative temperature coefficient (NTC) thermistors are the most commonly used technology in industrial applications. In an NTC thermistor, the resistance decreases with increasing temperature. NTC thermistors are typically made from a sintered ceramic material, and usually operate in the range of −55 to 200° C. (though some families of NTC thermistor operate outside of this range). The main types of NTC thermistor are bead NRC thermistors, disc and chip NTC thermistors, and glass-encapsulated NTC thermistors.

In bead NTC thermistors, platinum alloy lead wires are directly sintered into a ceramic body. The response times and stability are general better than for disc and chip NTC thermistors, but they are more fragile. They also enable operation at higher temperatures than disc and chip NTC thermistors.

Disc and chip NTC thermistors have metalized surface contacts. They are longer than bead NTC thermistors, so their response times are slower, but the larger size also provides a higher dissipation constant so they can handle higher currents. Disc thermistors are made by processing oxide powders in a round die, followed by high temperature sintering. Chip thermistors are usually made by spreading a slurry of material into a thick film, which is dried and cut into shape.

Glass-encapsulated thermistors are made by hermetically sealing bead-type NTC thermistors in glass, and are designed for use at temperatures >150° C., or for printed circuit board mounting.

NTC thermistors are typically made from ceramic materials and are the most common technology used for thermal sensor applications, since they demonstrate a large resistivity change (typically around −4% ° C.$^{-1}$) over a large temperature range, along with excellent stability. However, these bulk ceramic materials are not typically solution processable, limiting their application.

Katerinopoulou et al. described the formation of an A4 sensing sheet comprising screen printed thermistors formed from an ink incorporating manganese spinel oxide nanoparticles on the order of ~1 μm dispersed in a benzocylcobutene matrix (D. Katerinopoulou, P. Zalar, J. Sweelssen, G. Kiriakidis, C. Rentrop, P. Groen, G. H. Gelinck, J. van der Brand and E. C. P. Smits, *Adv. Electron. Mater.,* 2019, 5, 1800605). The sensor combined the stability of the NTC ceramic with flexibility and processability of the polymer binder. The B (or β) coefficient was measured at 3,512 K, which is within the range typically seen for bulk ceramics (~2,500-4,500 K). However, screen printing has a number of disadvantages including high material wastage, low resolution (~100 μm), excessively thick layers and higher set-up cost.

Nakajima et al. prepared nanoparticles of Co- and Ni-doped Mn-spinel oxides, which are typically used in their bulk form to produce NTC chip and film thermistors (T. Nakajima, S. Hanawa and T. Tsuchiya, *J. Appl. Phys.,* 2017, 122, 135309). Bulk Mn-spinel oxides may be fabricated by a number of methods, requiring high temperatures to produce sufficient ceramic quality and good temperature sensing properties. These high fabrication temperatures prevent the preparation of Mn-spinel oxides on flexible substrates. By preparing thermistors via the photoreaction of Mn-spinel oxide nanoparticles, the devices could be prepared on flexible substrates. NTC thermistors with a β value of 3,633 K were prepared on flexible polyimide substrates. However, the Mn-spinel oxide nanoparticles were deposited via spin-coating, which is disadvantageous for the reasons described above. Further, the nanoparticles were produced via a wet ball milling process, resulting in a broad size distribution between 10-50 nm. Thus, the nanoparticle deposition process was repeated three times to improve film porosity.

Nanoparticle-based inkjet-printed thermistors have previously been described by Huang et al. (C.-C. Huang, Z.-K. Kao and Y.-C. Liu, *ACS Appl. Mater. Interfaces,* 2013, 5, 12954). Inkjet-printed thermistors were prepared using NiO nanoparticles, operating in the room temperature to 200° C. range, with a β value of around 4,300 K, on both glass and flexible polyimide substrates. However, the NiO nanoparticle ink was prepared using commercially available NiO powder with an average particle size of 50 nm, requiring centrifugation steps to remove large particles.

Bulk $MoS_2$ was proposed as a suitable material for NTC thermistors in the 1960s, as described in U.S. Pat. No. 3,465,278. With a change in resistivity of ~5% K$^{-1}$ over the temperature range from ~110-330 K, a device made from bulk $MoS_2$ and electrodes was proposed as a thermistor in low temperature control circuits, restricting its potential use to niche laboratory applications operating at low and cryogenic temperatures. Thin films deposited from $MoS_2$ with suitable electrodes were found to have a temperature resistivity coefficient of ~0.2% $K^{-1}$. However, this material would not be suitable for inkjet printing.

BRIEF SUMMARY OF THE INVENTION

Herein, solution-processed NTC thermistor devices are described. NTC thermistors in accordance with various aspects of the disclosure may be fabricated via the solution processing of transition metal dichalcogenide (TMDC) quantum dots such as, for example, $MoS_2$ quantum dots. TMDC quantum dots may be formulated into an ink. The ink may be deposited on a substrate, for example, via inkjet printing, then subsequently processed to form an NTC thermistor. Solution-processed NTC thermistors may be integrated into RFID tags for various applications, or electrical circuits for circuit protection applications.

An inkjet-printable thermistor may offer advantages in terms of a high throughput, less labor intensive process than the manufacture of conventional NTC thermistors. A printable NTC thermistor may also be advantageous for novel applications such as electronic skins and soft robotics, which require a large number of sensors on a flexible substrate. For such applications, inkjet printing provides a cost-effective deposition method.

A first aspect of the invention provides a negative temperature coefficient (NTC) thermistor comprising:

- a substrate comprising:
  - a base material; and
  - a conductive layer on a surface of the base material; and
- a layer of transition metal dichalcogenide quantum dots on the conductive layer.

The transition metal dichalcogenide quantum dots may be made of $WO_2$, $WS_2$, $WSe_2$, $WTe_2$, $MnO_2$, $MoO_2$, $MoS_2$, $MoSe_2$, $MoTe_2$, $NiO_2$, $NiTe_2$, $NiSe_2$, $VO_2$, $VS_2$, $VSe_2$, $TaS_2$, $TaSe_2$, $RuO_2$, $RhTe_2$, $PdTe_2$, $HfS_2$, $NbS_2$, $NbSe_2$, $NbTe_2$, $FeS_2$, $TiO_2$, $TiS_2$, $TiSe_2$ or $ZrS_2$. The transition metal dichalcogenide quantum dots may be made of $WS_2$ or $MoS_2$.

The base material may be flexible. The base material may be made of a ceramic, silicon or silicon/$SiO_2$. The base material may be made of a polymer.

The conductive layer may be made of silver.

The NTC thermistor may further comprise a protective coating on at least one surface thereof.

The transition metal dichalcogenide quantum dots may further comprise capping agents.

The transition metal dichalcogenide quantum dot layer may have a thickness ranging from about 10 nm to about 150 nm. The transition metal dichalcogenide quantum dot layer may have a thickness ranging from about 40 nm to about 150 nm.

A second aspect of the invention provides a radio frequency identification (RFID) tag comprising an NTC thermistor according to the first aspect of the invention. The RFID tag may be flexible.

A third aspect of the invention provides a light-emitting diode (LED) device comprising an NTC thermistor according to the first aspect of the invention.

A fourth aspect of the invention provides an electrical circuit comprising an NTC thermistor according the first aspect of the invention connected in series with a capacitor.

BRIEF DESCRIPTION OF THE DRAWING(S)

Figure 5A:
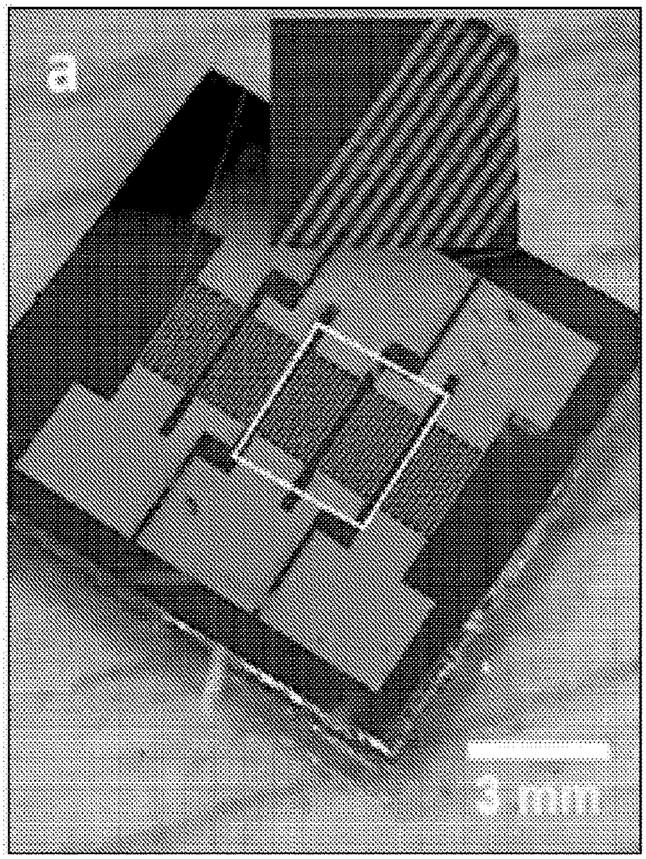

FIG. 5*a* shows an optical image of inkjet-printed silver electrodes on a 1×1 cm Si/$SiO_2$ substrate before $MoS_2$ QDs are printed to form NTC thermistors. The white bordered area in FIG. 5*a* highlights the location of the area shown in FIG. 5*b*.

Figure 5B:
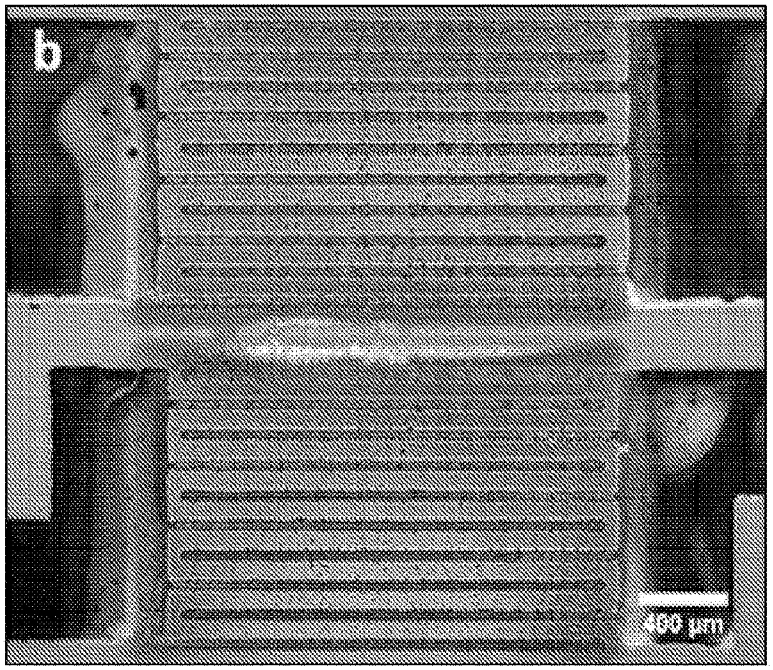

FIG. 5*b* shows an optical microscope image of interdigitated electrodes with $MoS_2$ QDs printed on top after annealing at 400° C. under $N_2$.

Figure 6A:
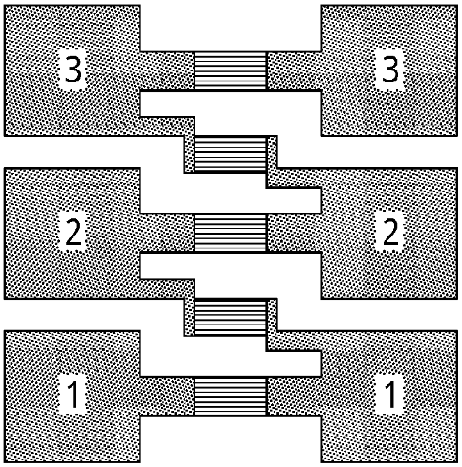

FIG. 6*a* is a diagram of inkjet-printed silver contacts and the numbering scheme used (not to scale). The five sets of interdigitated electrodes are shown as horizontal lines in the middle of each electrode set.

Figure 6B:
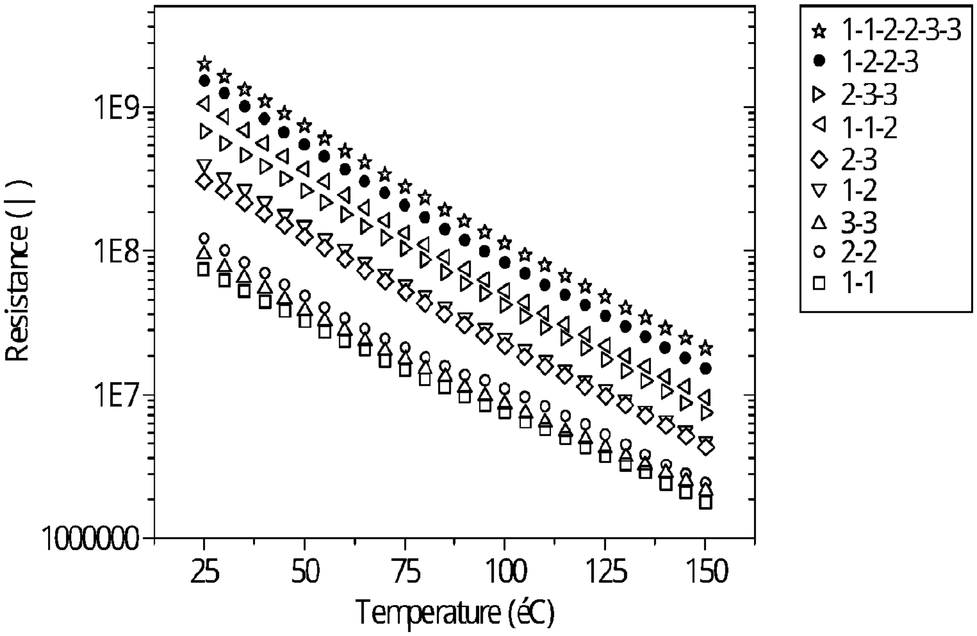

FIG. 6*b* is a graph showing resistance as a function of temperature for each of five NTC thermistors and two, three and five thermistors measured in series.

Figure 6C:
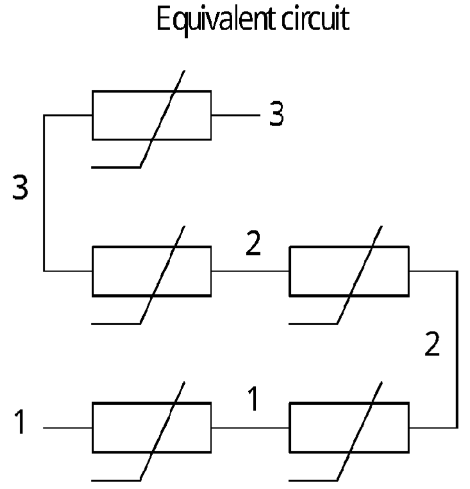

FIG. 6*c* is a schematic circuit diagram for the circuits measured in FIG. 6*b*. The numbers represent the positions of the first, second and third sets of contact pads which are visible in FIG. 5*a*.

Figure 6D:
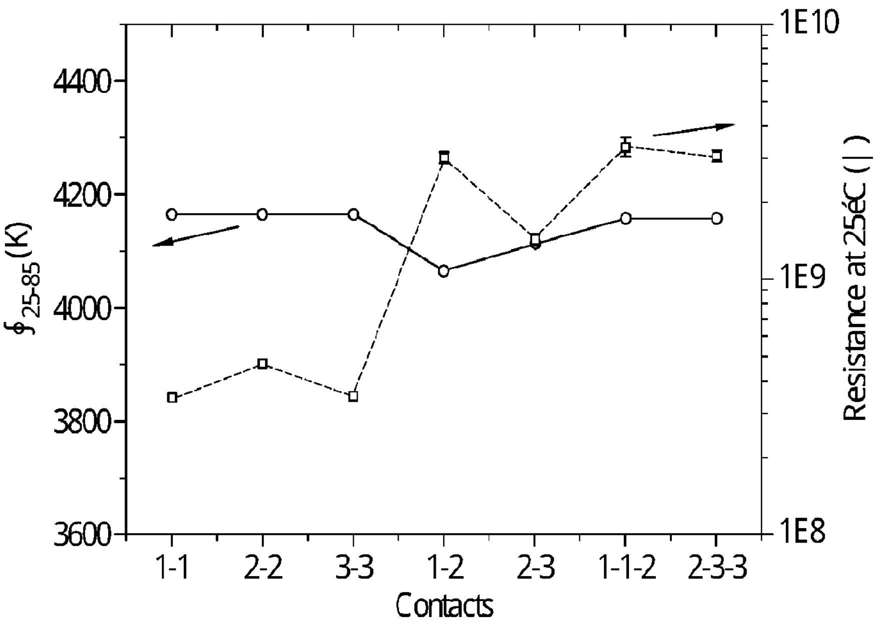

FIG. 6*d* is a graph showing resistance at 25° C. and $\beta_{25\text{-}85}$ for each of the five NTC thermistors and two thermistors measured in series after 1 week under in air. Lines between points are drawn as a guide and do not contain data values.

Figure 7:
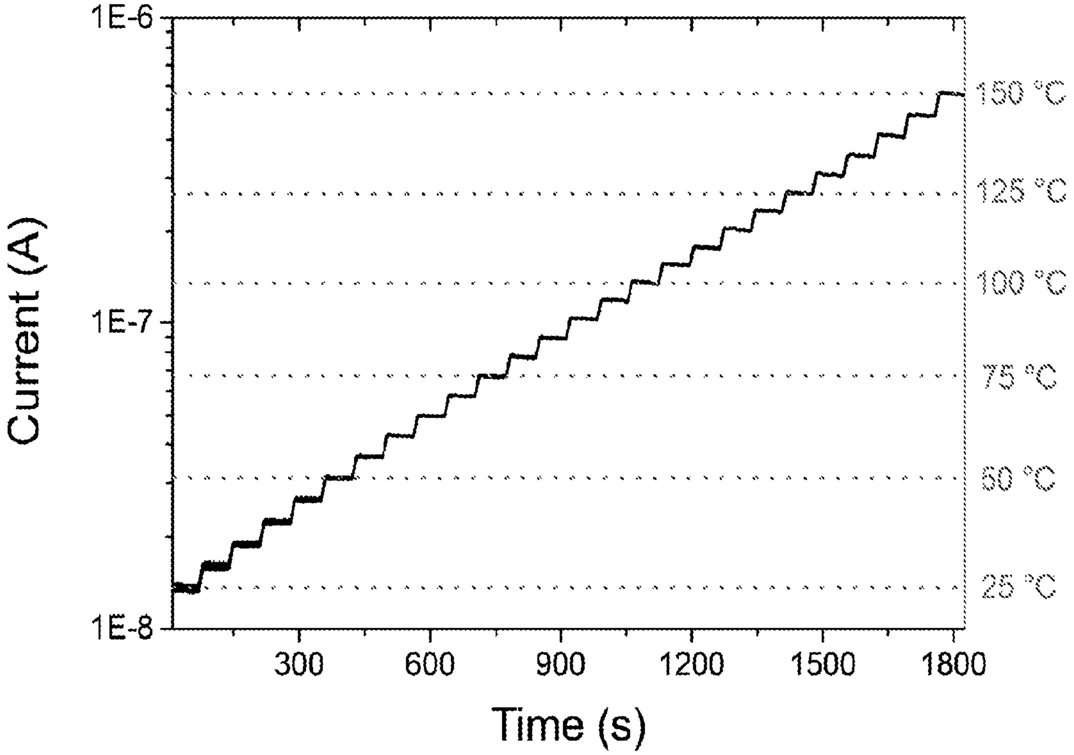

FIG. 7 is a graph showing current vs. time measured between contacts 1-1. A bias voltage of 1 V was applied and the temperature increased in 5° C. steps and held constant for 60 s after each increase.

Figure 8:
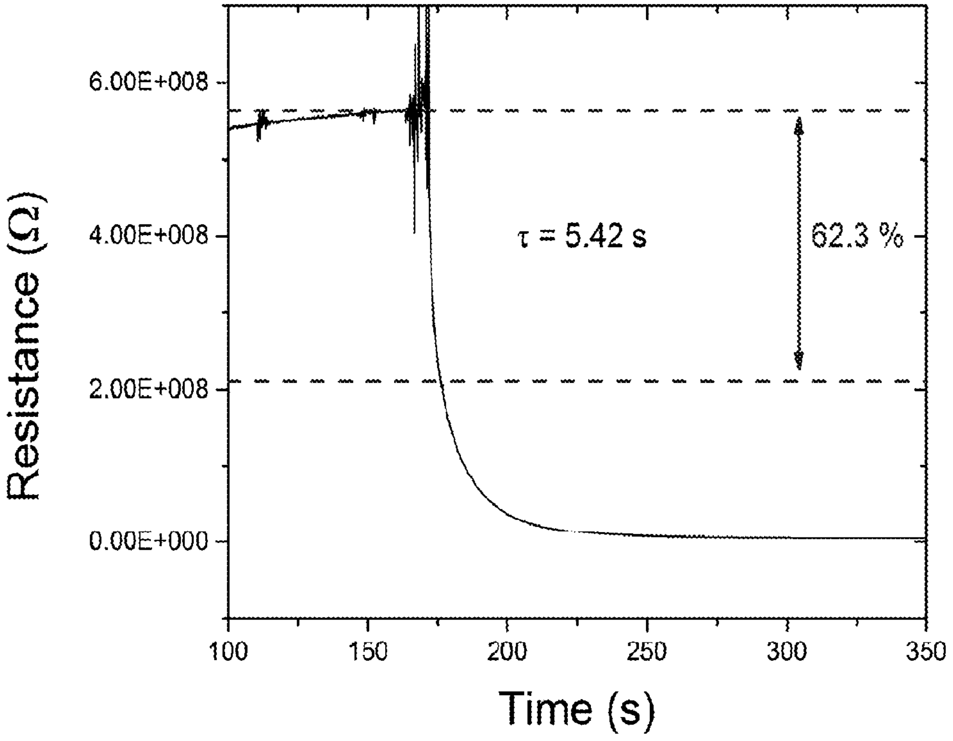

FIG. 8 is a graph showing resistance vs. time measured between contacts 1-1 with a bias voltage of 5 V. The bias voltage was applied and the thermistor stabilized at 25° C. before placing on a hotplate with a set temperature of 150° C.

Figure 9A:
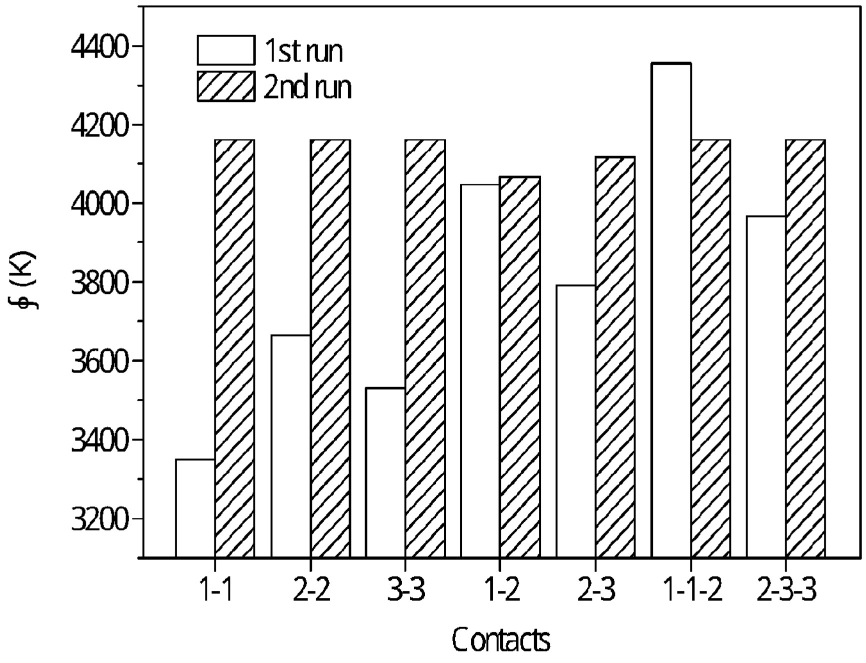

FIG. 9*a* shows β values at 25° C. measured for each thermistor and two thermistors in series directly after fabrication ($1^{st}$ run) and after 1 week of exposure to air ($2^{nd}$ run).

Figure 9B:
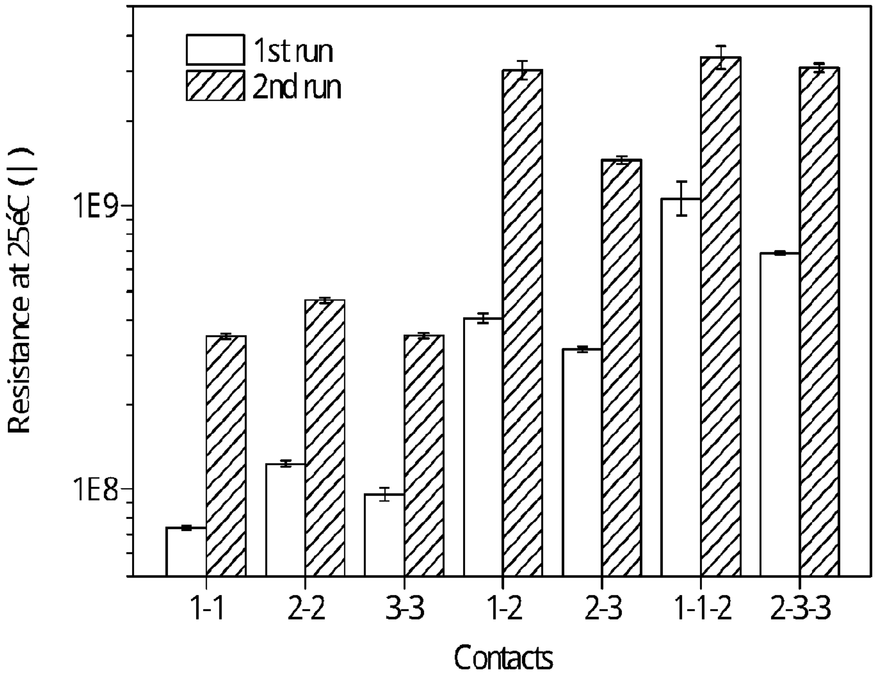

FIG. 9*b* shows resistance at 25° C. measured for each thermistor and two thermistors in series directly after fabrication ($1^{st}$ run) and after 1 week of exposure to air ($2^{nd}$ run).

Figure 10:
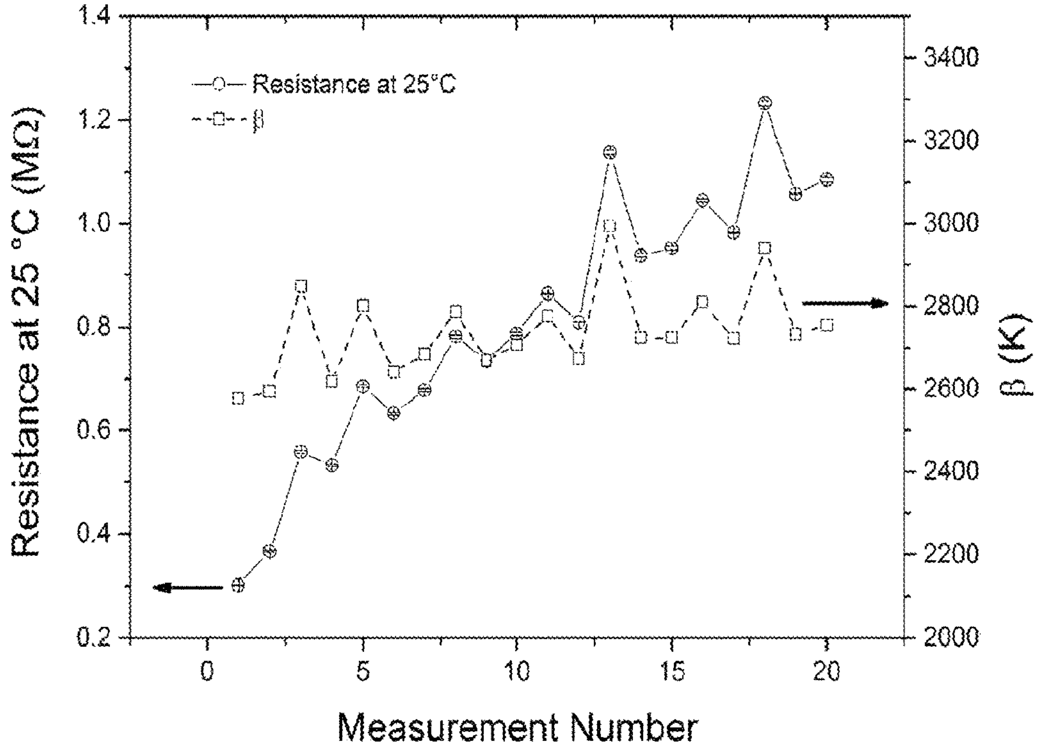

FIG. 10 shows β values and resistance at 25° C. measured for a non-inkjet-printed thermistor under $N_2$ over 2 weeks. Lines between points are drawn as a guide and do not contain data values.

Figure 11A:
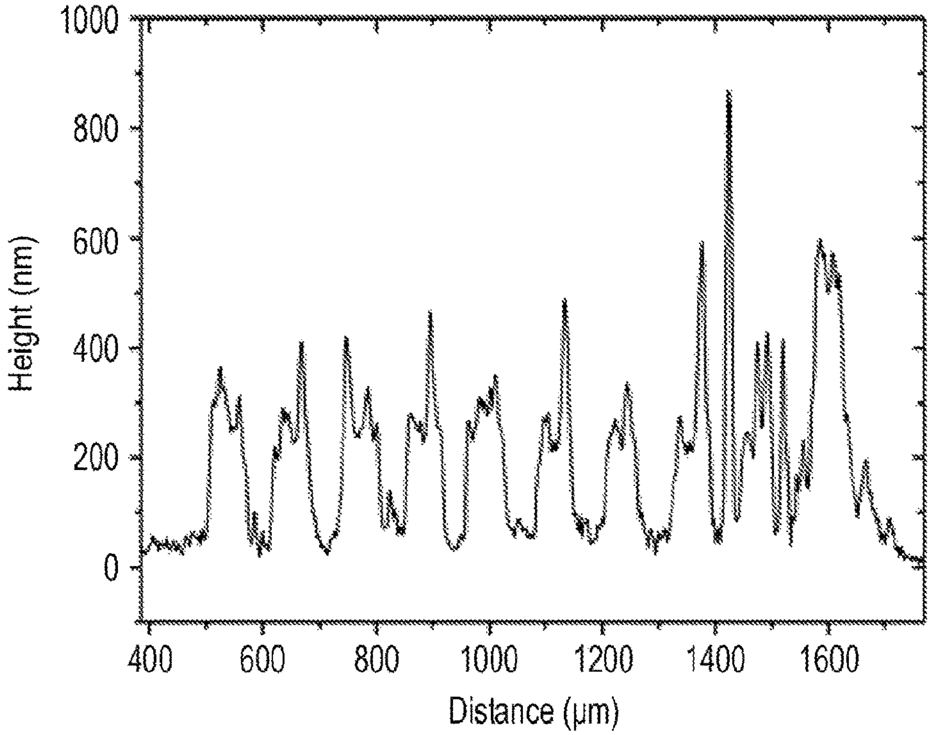
Figure 11B:
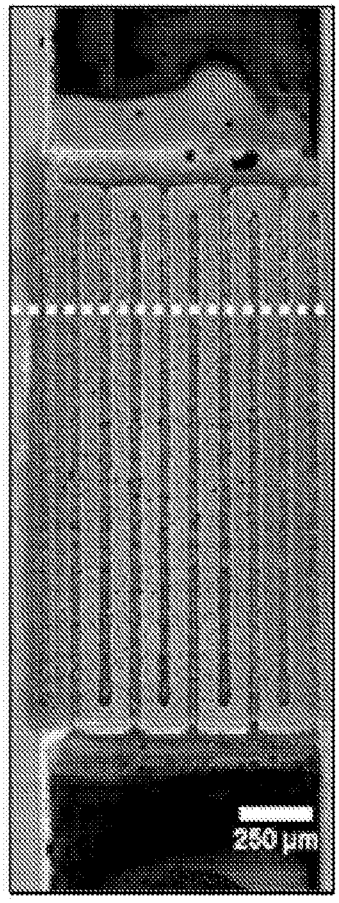

FIG. 11*a* shows the height profile of an inkjet-printed NTC thermistor measured by scanning across the dashed area in optical image FIG. 11*b*.

FIG. 11*b* is an optical image of an inkjet-printed NTC thermistor.

Figure 12:
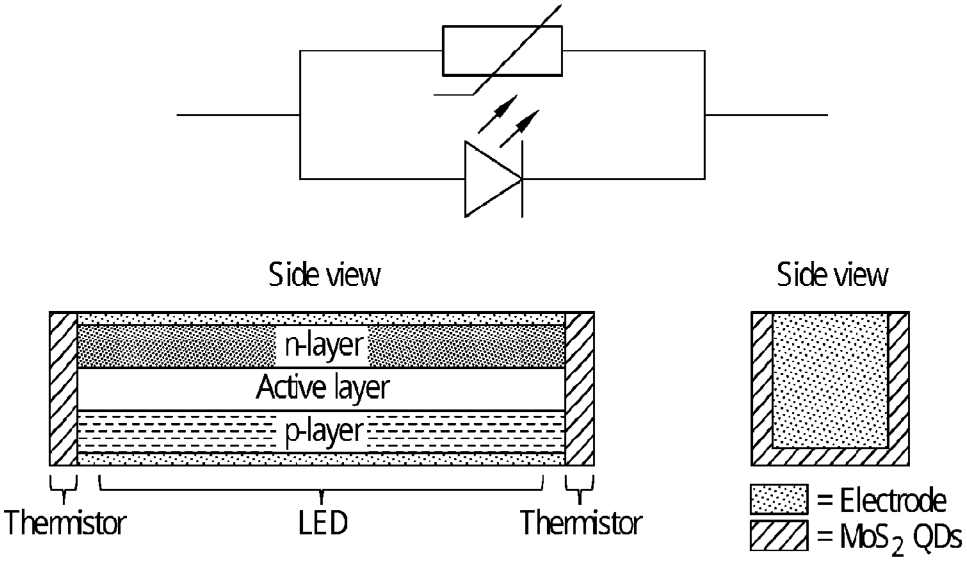

FIG. 12 shows a circuit diagram (top) and schematic diagram (bottom) of a thermistor-integrated LED.

Figure 13:
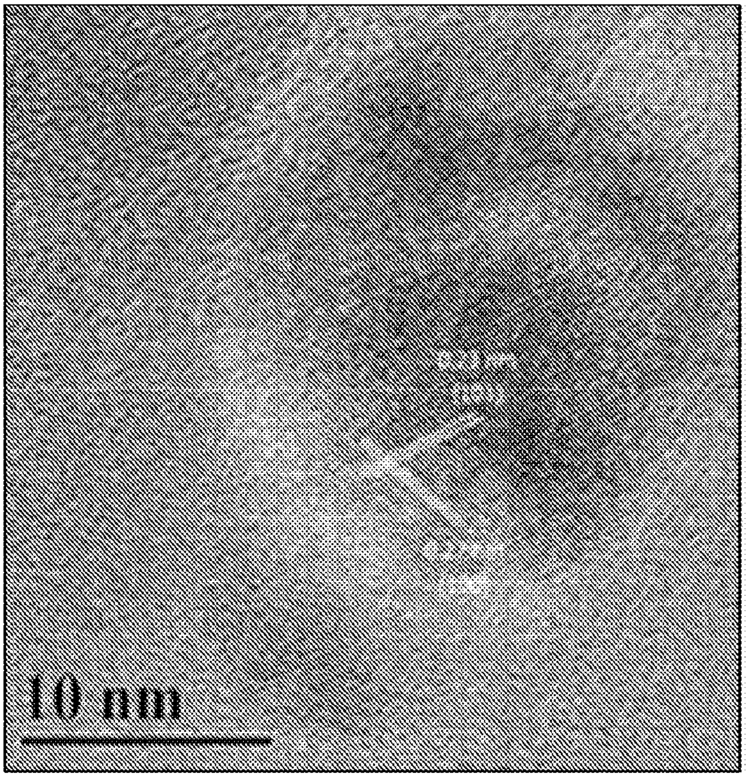

FIG. 13 is a TEM image of an $MoS_2$ nanoparticle formed in Example 1.

Figure 14:
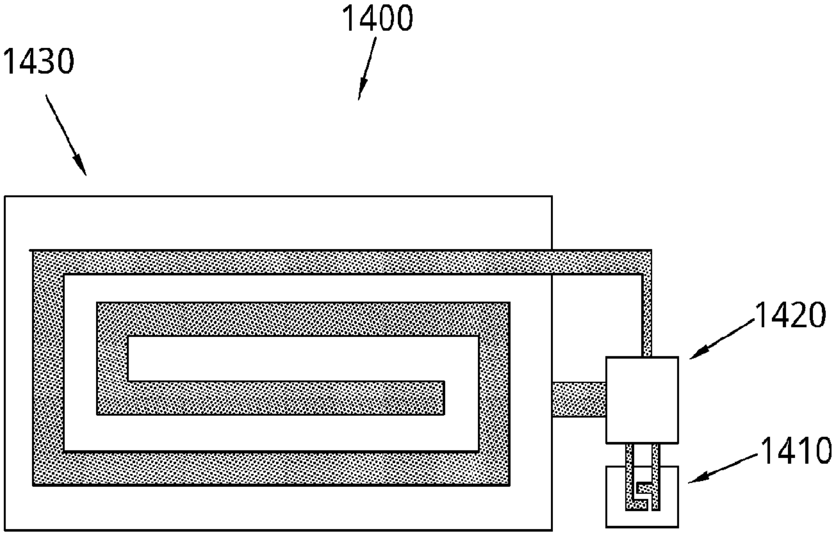

FIG. 14 is an illustrative schematic of a radio frequency identification (RFID) tag including NTC thermistor in accordance with various aspects of the disclosure.

Figure 15:
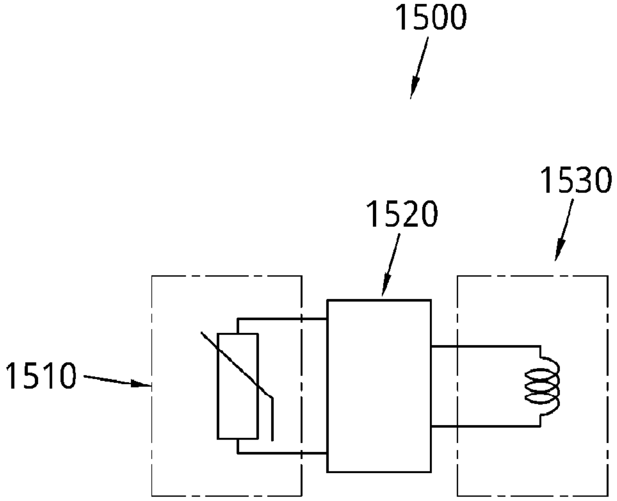

FIG. 15 is another illustrative schematic of a RFID tag including NTC thermistor in accordance with various aspects of the disclosure.

DETAILED DESCRIPTION OF THE INVENTION

Herein, solution-processed NTC thermistor devices are described. The NTC thermistors may be fabricated via the solution processing of TMDC quantum dots (QDs) such as, for example, $MoS_2$ quantum dots. TMDC QDs may be formulated into an ink. The ink may be deposited on a substrate via, for example, inkjet printing, then subsequently processed to form an NTC thermistor. The solution-processed NTC thermistor may be integrated into an electrical circuit for circuit protection applications.

As used herein, the term "nanoparticle" is used to describe a particle with dimensions on the order of approximately 1 to 100 nm. The term "quantum dot" (QD) is used to describe a semiconductor nanoparticle displaying quantum confinement effects. The dimensions of QDs are typically, but not exclusively, between 1 to 10 nm. The terms "nanoparticle" and "quantum dot" are not intended to imply any restrictions on the shape of the particle. The term "2D QD" is used to describe a particle with lateral dimensions on the order of approximately 1 to 10 nm and a thickness between 1 to 5 atomic or molecular monolayers.

Generally, a TMDC having the formula $MX_2$, where M is Ti, V, Co, Ni, Zr, Nb, Mo, Tc, Rh, Pd, Hf, Ta, W, Re, Ir and Pt, and X is a chalcogen atom (O, S, Se or Te), may be utilized. Specific examples include $WO_2$, $WS_2$, $WSe_2$, $WTe_2$, $MoO_2$, $MoS_2$, $MoSe_2$, $MoTe_2$, $NiO_2$, $NiTe_2$, $NiSe_2$, $VO_2$, $VS_2$; $VSe_2$; $TaS_2$; $TaSe_2$; $RuO_2$; $RhTe_2$; $PdTe_2$; $HfS_2$; $NbS_2$; $NbSe_2$; $NbTe_2$; $FeS_2$; $TiO_2$; $TiS_2$; $TiSe_2$; and $ZrS_2$. In some instances, the TMDC is $MS_2$ or $MSe_2$, where M is as defined above. In some instances, the TMDC is $MS_2$ or $MSe_2$, where M is Mo or W. In some instances, the TMDC is $MoS_2$ or $WS_2$.

The TMDC quantum dots (QDs) may be surface-functionalized with a "capping agent" or "ligand", which may impart solubility and assist in the processability of the QDs to form an ink. A ligand exchange process may be used to at least partially replace the ligands on the surface of as-synthesized QDs with an alternative ligand providing an affinity for a particular solvent. Suitable compounds for use as capping agents include, but are not limited to, saturated alkyl amines such as, for example, $C_6$-$C_{50}$ alkyl amines; unsaturated fatty amines such as, for example, oleylamine; aromatic amines such as, for example, pyridine; fatty acids such as, for example, myristic acid, palmitic acid, and oleic acid; phosphines such as, for example, trioctylphosphine (TOP); phosphine oxides such as, for example, trioctylphosphine oxide (TOPO); alcohols such as, for example, hexadecanol, benzylalcohol, ethylene glycol, propylene glycol; thiols such as, for example, 1-dodecanethiol; and selenols such as, for example, 1-octaneselenol. In some instances, the TMDC QDs may be surface functionalized with short-chain ligands. As used herein, a "short-chain ligand" refers to a ligand having a hydrocarbon chain of eight carbons or fewer. Examples of suitable short-chain ligands include, but are not restricted to: alkane thiols such as, for example, 1-octanethiol, 1-heptanethiol, 1-hexanethiol, 1-pentanethiol, 1-butanethiol, 1-propanethiol; and carboxylic acids such as, for example, octanoic acid, heptanoic acid, hexanoic acid, pentanoic acid, butanoic acid, and propanoic acid. Short-chain ligands may enable close packing of the nanoparticles for improved charge transport. In some instances, the TMDC QDs may be surface functionalized with entropic ligands. As used herein, "entropic ligand" refers to a ligand having an irregularly branched alkyl chain. Examples of suitable entropic ligands include, but are not restricted to: irregularly branched thiols such as, for example, 2-methylbutanethiol, and 2-ethylhexanethiol; and irregularly branched alkanoic acids such as, for example, 4-methyloctanoic acid, 4-ethyloctanoic acid, 2-butyloctanoic acid, 2-heptyldecanoic acid, and 2-hexyldecanoic acid.

In some instances, TMDC QD-containing inks according to present disclosure comprise TMDC QDs, a solvent and a viscosity modifier. In some instances, the solvent can be a non-coordinating solvent such as aliphatic hydrocarbons (for example pentane, hexane, heptane, cyclohexane, and isooctane), and aromatic hydrocarbons (for example, benzene, toluene, xylene (ortho-, meta-, or para-), mesitylene, biphenyl, and ethylbenzene). In some instances, the solvent can be a coordinating solvent such as monohydric alcohols (for example, methanol, ethanol, tert-butanol, and isopropanol), polyhydric alcohols (for example, glycols and glycerol), ketones (for example, acetone, methyl ethyl ketone, methyl isobutyl ketone, and cyclohexanone), esters (for example, ethyl acetate, propyl acetate, butyl acetate, isobutyl acetate, and amyl acetate), ethers (for example, ethyl ether, isopropyl ether, and tetrahydrofuran), and alkyl amines (for example, ethylenediamine, N-propyl amine, and aniline or substituted anilines). In some instances the solvent can include more than one non-coordinating solvent. In some instances, the solvent can include more than one coordinating solvent. In some instances, the solvent can include one or more non-coordinating solvents and one or more coordinating solvents. Suitable viscosity modifiers include, but are not limited to, terpineol, glycerol, diols, and glycols. In addition to solvent(s) and viscosity modifier, inks according to disclosure can include one or more of ionic surface tension modifiers, polymeric surface tension modifiers, wetting agents, antifoaming agents, polymers, and monomers.

In some instances, inks according to the various aspects of the disclosure can have a TMDC QD concentration ranging from about 0.1 mg per ml of ink (mg/ml) to about 25 mg/ml. In other instances, inks according the various aspects of the disclosure can have a TMDC QD concentration ranging from about 1 mg/ml to about 20 mg/ml, alternatively from about 2 mg/ml to about 15 mg/ml, alternatively from about 3 mg/ml to about 10 mg/ml, alternatively from about 4 mg/ml to about 8 mg/ml, alternatively from about 5 mg/ml to about 7 mg/ml, and alternatively about 6 mg/ml. In some instances, the volumetric ratio of solvent to viscosity modifier can range from about 15:1 to about 1:1. In some instances, the volumetric ratio of solvent to viscosity modifier can range from about 12.5:1 to about 1.1:1, alternatively from about 10:1 to about 1.25:1, alternatively from about 9:1 to about 1.5:1, alternatively from about 8:1 to about 1.75:1, alternatively from about 7:1 to about 2:1, alternatively from about 6:1 to about 2.25:1, alternatively from about 5:1 to about 2.5:1, alternatively from about 4.5:1 to about 2.5:1, alternatively from about 4:1 to about 2.5:1, alternatively from about 3.5:1 to about 2.5:1, alternatively from about 3.25:1 to about 2.75:1, and alternatively about 3:1.

Ink according to the disclosure can be deposited on a substrate using any method known to one skilled in the art. Examples include, but are not restricted to, spin-coating, slit-coating, spray coating, slot dye coating, drop-casting, doctor blading, and inkjet printing. In some instances, inkjet printing is preferred.

The substrate is not particularly limited. The substrate generally includes a base material and a conductive material disposed thereon. In some instances, the base material can be made from a rigid material such that the substrate is resistant to deformation upon application of bending, twisting, or other forces. In some instances, a base material such as a ceramic, a glass, a metal, a metal alloy, a rigid plastic, a silicon (Si) wafer, or an Si/$SiO_2$ wafer can be used as a rigid base material. In some instances, the base material can be made of a flexible material such that the material can be reversibly deformed upon application of bending, twisting, or other forces. In some instances a base material such as a flexible polymer film, a flexible metallic film, a fabric or a paper can be used as a flexible base material. In some instances, rigid or flexible base materials can be made from a polymer such as, for example polyethylene terephthalate (PET); polyethylene naphthalate (PEN); polycarbonate (PC); polyestersulfone (PES); polyacrylates (PAR); polycyclic olefin (PCO); and polyimide (PI). The composition of the conductive material is not particularly limiting. In some instances, the base material can be copper, platinum, gold or silver. In some instances, silver is preferred. In some instances, the conductive material can be formed on the base material in the form of a plurality of bus bars, finger lines, and contacts for electrical coupling with other electronic components. In some instances, the conductive material can be formed on the base material in the form of a vertical stack, wherein the ink is deposited between two conductive tracks of the vertical stack.

Inks according to the disclosure is deposited on the substrate such that the conductive material is located between the base material and the ink. Ink deposition can take place at any temperature between room temperature and the boiling point of the solvent. After deposition of the ink, the substrate is annealed at elevated temperature under an inert atmosphere (such as nitrogen or argon) until the solvent has been fully removed. In some instances, annealing is performed at a temperature, or ranges of temperatures, from about 100° C. to about 600° C. In some instances, annealing is performed at a temperature, or ranges of temperatures, from about 150° C. to about 550° C., alternatively from about 200° C. to about 500° C., alternatively from about 250° C. to about 450° C., alternatively from about 300° C. to about 450° C., alternatively from about 350° C. to about 450° C., and alternatively about 400° C. Annealing may be conducted for any suitable period of time. In some instances, annealing is conducted for a period of time ranging from about 10 minutes to about 2 hours.

After annealing, a TMDC QD layer is formed on the substrate. The TMDC QD layer can have a thickness ranging from about 10 nm to about 1 μm, alternatively from about 20 nm to about 900 nm, alternatively from about 30 nm to about 800 nm, alternatively from about 40 nm to about 700 nm, alternatively from about 50 nm to about 600 nm, alternatively from about 60 nm to about 500 nm, alternatively from about 70 nm to about 400 nm, alternatively from about 80 nm to about 300 nm, alternatively from about 80 nm to about 200 nm, alternatively from about 10 nm to about 500 nm, alternatively from about 20 nm to about 400 nm, alternatively from about 30 nm to about 300 nm, alternatively from about 40 nm to about 200 nm, alternatively from about 40 nm to about 150 nm, and alternatively from about 50 nm to about 150 nm.

In some instances, NTC thermistors according to various aspects of the disclosure can further include a protective coating, or barrier layer, applied on one or more external surfaces for protection from moisture and/or oxygen. In some instances, protective coatings can be made from epoxy-based resins, polyurethanes-based resins, hydrophilic (meth)acrylate polymers, polyvinyl alcohol, poly(ethylene-co-vinyl alcohol), polyvinyl dichloride, silicones, polyimides, polyesters, polyvinyls, polyamides, phenolics, cyanoacrylates, gelatin, water glass (sodium silicate), and polyvinylpyrrolidones. In some instances, NTC thermistors according to various aspects of the disclosure can be encapsulated with a glass or polymeric cap with a defined cavity depth, for example 0.35 mm, with desiccant getter in the bottom of the cap and UV resin on rims of the cap, under an $N_2$ environment with oxygen and moisture levels less than 1 ppm. The UV resin can be cured under a UV mercury lamp for a predetermined period of time, for example 5 minutes, to cure the UV resin and seal the cap around the NTC thermistor with the electrical contacts of the NTC thermistor protruding out of the cap for electrical connection of the capped NTC thermistor with other electrical components of an electronic device, circuit or system.

NTC thermistors prepared as described herein described herein may be integrated into electrical circuits for circuit protection applications. For example, an inkjet-printed NTC thermistor comprising a substrate with $MoS_2$ QDs disposed thereon could be connected in series with a capacitor.

Other potential circuit protection applications can include the prevention of overheating in light-emitting diode (LED) devices. LED lifetimes can exceed 100,000 hours if operated properly. However, high temperatures can significantly shorten LED lifetime and impair their brightness. It is envisioned that an NTC thermistor according the disclosure can be integrated into each LED chip of an LED device, allowing for better protection of the device in the event even just one LED overheats.

Further advantages include that the $MoS_2$ quantum dot material is inkjet printable, offering ease of processing. Methods of producing inkjet-printed NTC thermistors described herein offer advantages in terms of providing a higher throughput, less labor intensive process than the manufacturing of conventional NTC thermistors.

TMDC QDs may be deposited on flexible substrates to form NTC thermistors which require use in situations where the thermistor must be flexible during use, such as electronic skins and soft robotics, or for use as wearable temperature sensors for continuous monitoring of body temperature in, for example, a clinical setting.

In some instances radio frequency identification (RFID) tags including NTC thermistors in accordance with various aspects of the disclosure can be prepared. Such RFID tags can comprise an NTC thermistor, made in accordance with various aspects of the disclosure, electrically coupled with a near field communication (NFC) sensing circuit, which is electrically coupled with an NFC antenna. In some instances, RFID tags having NTC thermistors according to various aspects of the disclosure can be used as a component in a battery or capacitor for passive thermal management thereof. In some instances, RFID tags having NTC thermistors according to various aspects of the disclosure can be used as temperatures probes in healthcare and disease tracking. In some instances, RFID tags having NTC thermistors according to various aspects of the disclosure can be used as be incorporated into biologically acceptable polymers and/or adhesives for use as flexible temperature sensor arrays in soft robotic and electronic skins. In some instances, RFID tags having NTC thermistors according to various aspects of the disclosure can be used for temperature monitoring applications in printed and/or flexible electronics. In some instances, RFID tags having NTC thermistors according to various aspects of the disclosure can be used as components in smart packaging applications, such as for the tracking of pharmaceutical or food temperature prior to consumption, or temperature-sensitive fine chemicals.

Devices having NTC thermistors in accordance with various aspects of the disclosure can be fabricated in small dimensions and can be printed in arrays to enable sensitive temperature mapping over large areas. For example, allowing for reasonable spacing between devices, a square, inkjet-printed NTC thermistor 250 μm in length would give a thermistor density of 1,600 per $cm^2$.

The following non-limiting examples are provided for illustrative purposes only in order to facilitate a more complete understanding of representative embodiments now contemplated. These examples should not be construed to limit any of the embodiments described in the present specification.

Example 1. Inkjet-Printed NTC Thermistor Using Pre-Patterned Gold Contact Electrodes Synthesis of Spherical $MoS_2$ QDs. Spherical $MoS_2$ QDs were synthesized as follows: Synthesis was carried out under an inert $N_2$ environment. 0.132 g $Mo(CO)_6$ was added to a vial capped with a SUBA-SEAL® rubber septum in a glovebox. 14 g octadecane was degassed for 2 hours at 100° C. in a round-bottom flask, then cooled to room temperature. 2 g hexadecylamine and 2 g octadecane were degassed for 2 hours at 100° C. in a vial, then cooled to 40-50° C. and injected into the vial containing the $Mo(CO)_6$ and shaken well. The reaction mixture was warmed gently to 150° C. and the vial shaken to dissolve any sublimed $Mo(CO)_6$, then cooled to room temperature to form a $Mo(CO)_6$-amine complex. The round-bottom flask (containing 14 g octadecane) was then heated to 300° C. The $Mo(CO)_6$-amine complex was warmed gently to ~40° C. until the solids melted, and 1.5 mL 1-dodecane thiol (DDT) were added. It was then immediately loaded into a syringe and rapidly injected into the round-bottom flask. The temperature was adjusted to ~260° C. The reaction mixture was left for 8 minutes at 260° C. then cooled to 60° C. To isolate the product, 200 mL acetone was added and centrifuged at 8,000 rpm for 5 minutes. FIG. 13 is a TEM image of an $MoS_2$ nanoparticle formed in using the protocol above.

Surface Functionalization with Pyridine Ligands. Pyridine ligand exchange was performed by adding all the solids obtained from the above example to a round-bottom flask, backfilled three times and flushed with $N_2$, then 50 mL anhydrous pyridine was added and warmed to 105° C. for 12 hours. The solvent was reduced to dry then 10 mL acetone was added and the solids precipitated with 50 mL hexane and centrifuged at 8,000 rpm for 5 minutes. A light brown-colored supernatant was discarded and the solids were dissolved in toluene.

Figure 1:
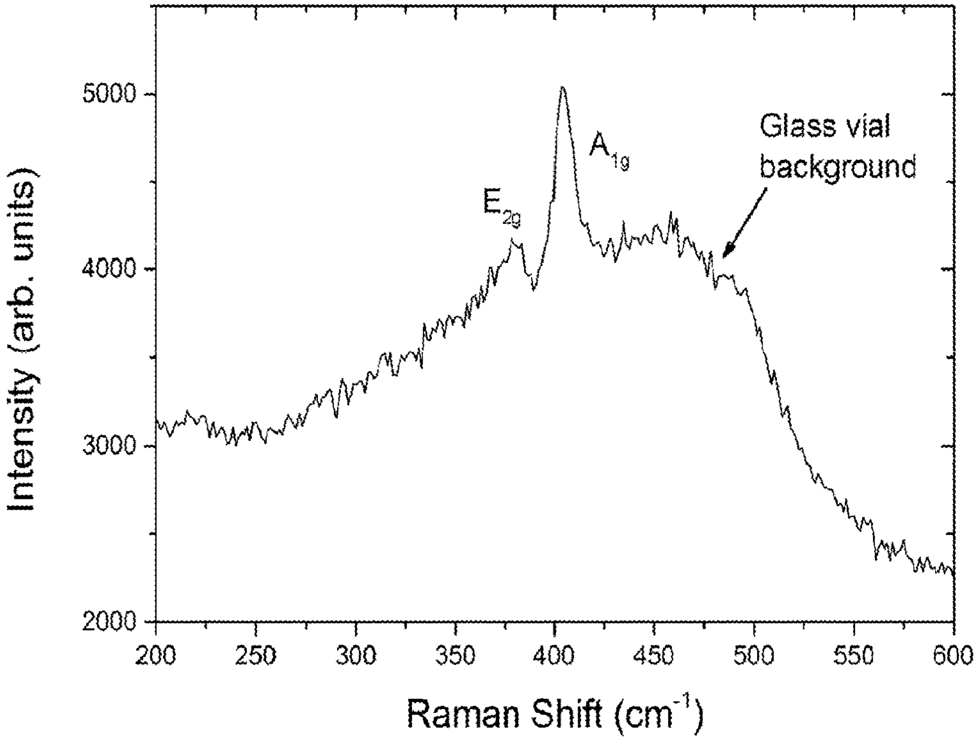
FIG. 1 shows a Raman spectrum of $MoS_2$ QDs made in accordance with various aspects of the disclosure after pyridine ligand exchange.

Raman Microscopy. A Renishaw inVia Raman microscope was used to identify the presence of $MoS_2$ QDs. Pyridine ligand exchanged $MoS_2$ QDs were dried under nitrogen at 200° C. for 2 hours in a vial before sealing. Raman spectra were obtained through the vial with the use of a 514 nm excitation wavelength laser, showing clear $MoS_2$ $E_{2g}$ and $A_{1g}$ peaks, despite the large background signal present from the glass vial (FIG. 1).

Ink Formulation. An inkjet printable ink was formulated as follows: Pyridine-functionalized $MoS_2$ QDs (10 mg) were dissolved in a 3:2 v/v mixture of cyclohexanol and terpineol (2 mL) to form a solution.

Figure 2:
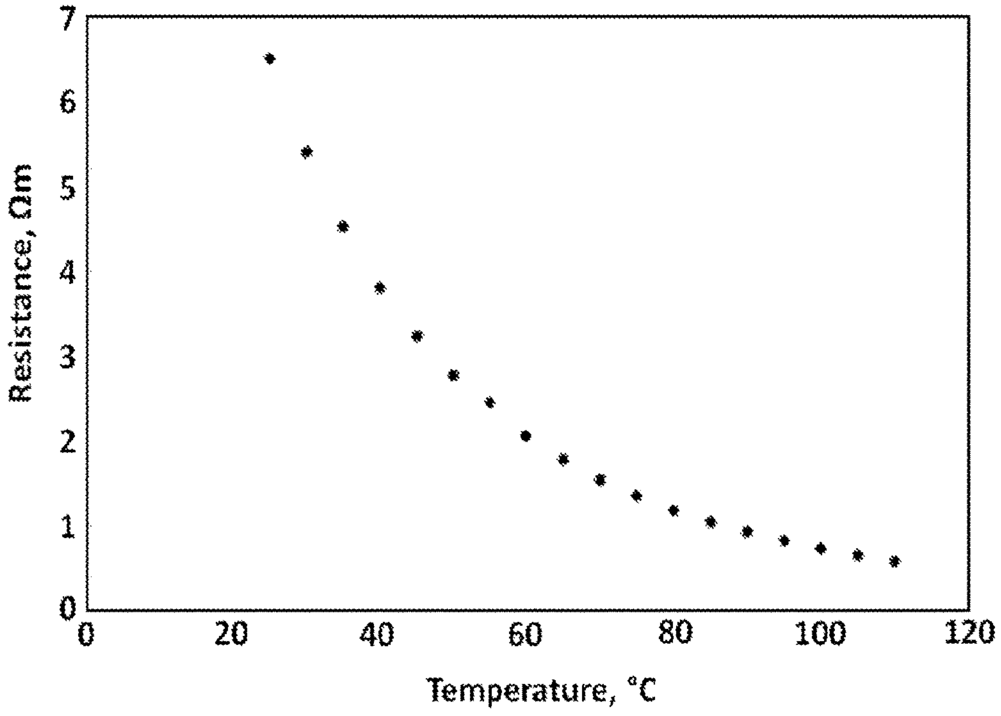
FIG. 2 is a graph showing resistance vs. temperature, at 1 V, for printed $MoS_2$ QDs.

Electrical Measurements. The above ink formulation was inkjet-printed onto a quartz substrate with pre-patterned gold contacts before annealing at 400° C. for 1 h, under vacuum. The electrical properties were measured by connecting two of the gold contacts to a Keithley 2400 Sourcemeter and a custom Labview program used to record the current while sweeping the bias voltage. The substrate temperature was controlled using a Linkam LTS350 temperature controlled stage connected to a Linkam TMS94 control system. The temperature was automatically varied using a custom Labview program. Measuring resistance vs. temperature, at 1 V, the resistance was found to decrease exponentially with increasing temperature (FIG. 2). The results show the device is behaving as an NTC thermistor.

Figure 3:
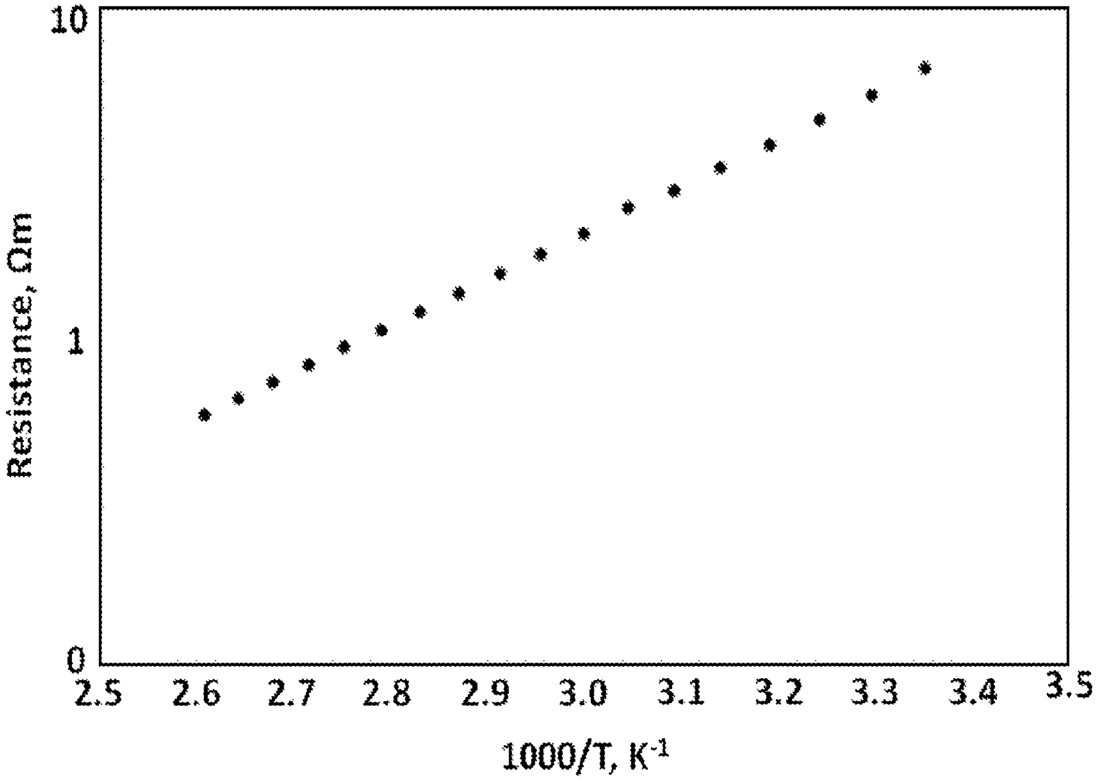
FIG. 3 is a graph showing resistance vs. 1000/temperature for printed $MoS_2$ QDs.

The resistance vs. 1000/temperature for the printed $MoS_2$ QDs is shown in FIG. 3. Each point is the average of the forward and reverse sweep value and has an error bar which corresponds to the standard deviation. However, the error bars are not visible on the graph due to the small standard deviation between both sweeps. The linear nature of the graph when a logarithmic y-axis is used indicates the device obeys the Arrhenius equation:

$$R=R_{\infty}e^{B/T}$$

where R is the measured resistance at temperature T; $R_{\infty}$ is the resistance at infinite temperature and B is the B (or β) coefficient. The B (or β) coefficient provides the resistance change for a change in temperature, over a particular temperature range. It can be used as a measure of the sensitivity of a thermistor.

$$B=\frac{\ln\left(\frac{R_{T_1}}{R_{T_2}}\right)}{\frac{1}{T_1}-\frac{1}{T_2}}$$

For the printed $MoS_2$ QDs, the β (B) coefficient was calculated to be 3,260 K, which is within the range typically observed for bulk ceramic NTC thermistors.

Figure 4:
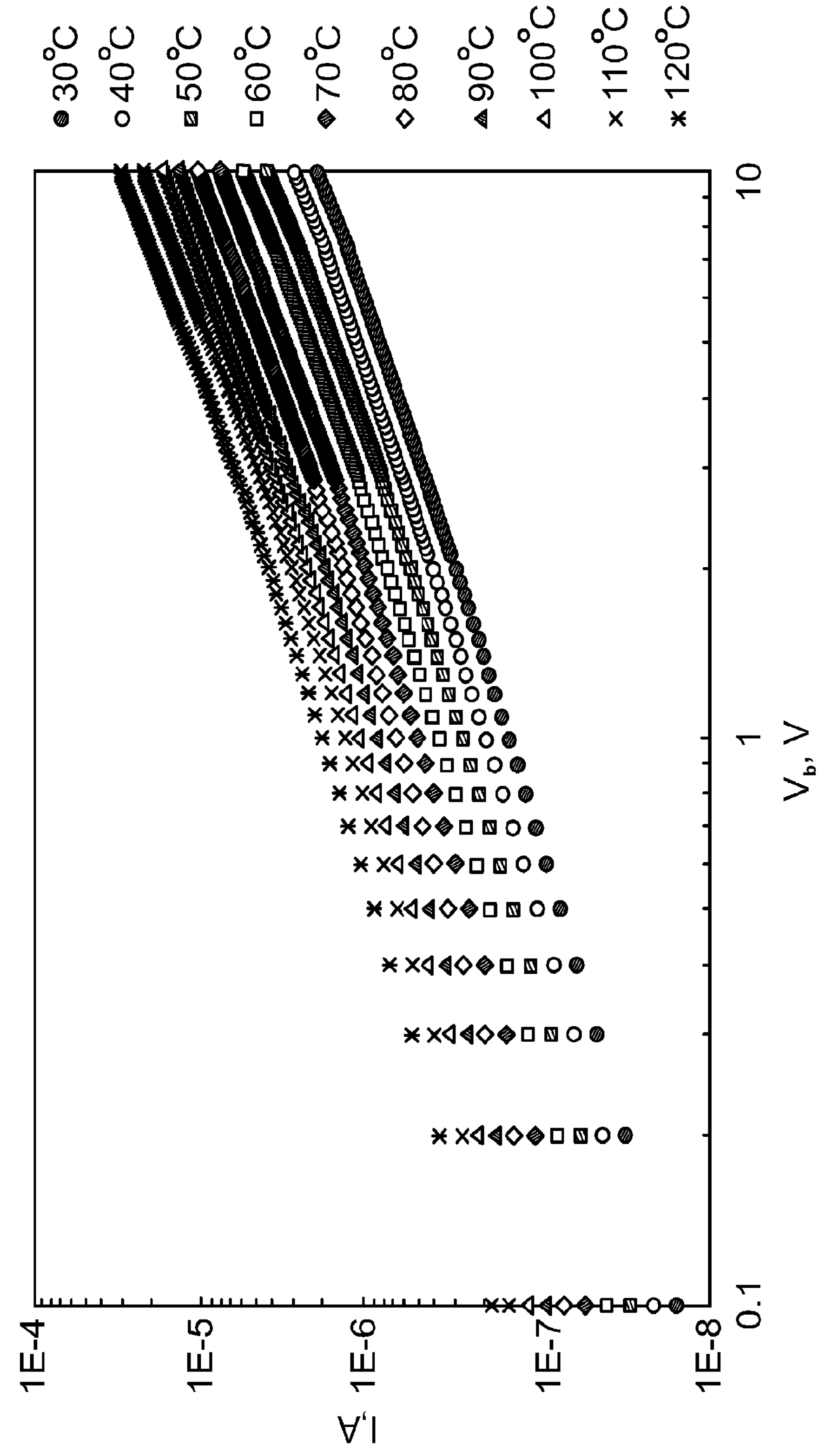
FIG. 4 is a graph showing current vs. bias voltage for printed $MoS_2$ QDs.

The current was measured as a function of bias voltage, at temperatures between 30-120° C. (FIG. 4). The results indicate that a low bias voltage (<1 V) can be used to operate the device, making it well suited to applications where low power consumption is required.

Example 2. Fully Inkjet-Printed NTC Thermistor $MoS_2$ QDs were synthesized and surface functionalization with pyridine ligands performed using the same method detailed in Example 1.

Inkjet-Printed Silver Electrodes. GenesInk SmartInk S-CS01130 was filtered through a 0.45 μm syringe filter and printed using a 10 pL Fujifilm Dimatix cartridge. A Dimatix DMP-2800 inkjet printer was used to print silver electrodes with 40 μm drop spacing on a 1×1 cm $Si/SiO_2$ substrate which was heated 50° C. The design of the printed electrodes is shown in FIG. 6*a* and FIG. 6*c* and consisted of six 2×2 mm contact pads with five sets of interdigitated electrodes. All electrodes had a width of 1.15 mm. The electrodes between contacts had a length of 2 mm. A gap of about 65 μm was left between each set of interdigitated electrodes. The electrodes were printed to allow the measurement of multiple thermistors in series using the pre-printed contact pads.

$MoS_2$ QD Ink Formulation and Printing. $MoS_2$ QD ink was formulated by dispersing 12 mg $MoS_2$ QDs in 1.5 mL toluene before adding 0.5 mL terpineol as a viscosity modifier. The final ink had a $MoS_2$ QD concentration of 6 mg/mL and had a toluene to terpineol ratio of 3:1 by volume. The $MoS_2$ QD ink was filtered through a 0.45 μm syringe filter and printed using a 1 pL Fujifilm Dimatix cartridge. A Dimatix DMP-2800 inkjet printer was used to print rectangles with dimensions 2.3×1.25 mm to cover the interdigitated electrodes. 20 μm drop spacing and 50 print passes were used due to a small drop volume cartridge being used. The substrate temperature was kept at 50° C. throughout printing. The substrate was annealed at 400° C. for 30 mins, under $N_2$ before electrical measurements were conducted.

Electrical Measurements. The electrical properties were measured by connecting two of the silver contact pads to a Keithley 2400 Sourcemeter and using Keithley Kickstart 2 to apply a bias voltage of 1 V and record the current over time. The substrate temperature was controlled using a Linkam LTS350 temperature controlled stage connected to a Linkam TMS94 control system. The temperature was automatically held constant for 1 min before increasing in 5° C. steps at a rate of 30° C./min between 25 and 150° C. From the plots obtained, average resistance at a set temperature was calculated for each of the five single thermistors and for two, three and five thermistors measured in series (FIG. 6*b*).

Each of the five individual NTC thermistors showed similar resistance values across the range of temperatures measured (FIG. 6*b*). All of the printed thermistors demonstrated a drop in resistance of over one order of magnitude when heated by 100° C. and an increase in resistance was observed for multiple thermistors measured in series, in accordance with Ohm's law (FIG. 6*b* and FIG. 6*c*). The β values between 25 and 85° C. ($\beta_{25-85}$) were calculated for each thermistor and two measured in series (FIG. 6*d* and Table 1) after 1 week in air. In FIG. 6*d*, lines between points are drawn as a guide and do not contain data values. The β values for the thermistors at contacts 1-1, 2-2 and 3-3 were within 1 K, showing potential for highly reproducible devices.

TABLE 1

Resistance at 25° C. and $\beta_{25-85}$ for each of the five single NTC thermistors and two, three and five thermistors measured in series after 1 week under in air.

| Contacts | $\beta_{25-85}$ (K) | Resistance at 25° C. (Ω) |
|---|---|---|
| 1-1 | 4165 | $3.48 \times 10^8 \pm 8.37 \times 10^6$ |
| 2-2 | 4166 | $4.66 \times 10^8 \pm 9.31 \times 10^6$ |
| 3-3 | 4165 | $3.48 \times 10^8 \pm 8.20 \times 10^6$ |
| 1-2 | 4066 | $3.00 \times 10^9 \pm 2.03 \times 10^8$ |
| 2-3 | 4114 | $1.44 \times 10^9 \pm 4.12 \times 10^7$ |
| 1-1-2 | 4157 | $3.31 \times 10^9 \pm 2.99 \times 10^8$ |
| 2-3-3 | 4156 | $3.04 \times 10^9 \pm 1.06 \times 10^8$ |

FIG. 7 demonstrates the stable, exponential increase in current obtained with a bias voltage of 1 V and stepwise temperature increases of 5° C. It was noted that the Linkam LTS350 hotplate used would occasionally heat to 0.2° C. above the desired temperature before cooling to the correct temperature, resulting in a decrease in current over time after some heating steps.

The thermal time constant (τ) is defined as the time required for the resistance to change 62.3% and was measured as 5.42 s between 25 and 150° C. for thermistor 1-1 (FIG. 8). The thermal time constant is dependent on the temperatures used, the measurement method and the dimensions of the thermistor.

Atmospheric Sensitivity. Thermistor measurements were taken immediately after printing and again after 1 week of exposure to air. An increase in both β and resistance values were observed (FIG. 9). The resistance values at 25° C. all increased by around 1 order of magnitude, whereas the β values increased and plateaued to give uniform values. As such, tailoring the fabrication process to allow for minimal exposure to air before encapsulating may be useful in fabricating thermistors with desired β values to a maximum of around 4,165 K.

Non-inkjet-printed thermistors fabricated and measured under inert conditions (FIG. 10) demonstrated only small changes in β value, which were consistent with small $O_2$ level fluctuations in the glovebox. As the β value remained around 2,700 K for thermistors made and measured in the glovebox, the range of β values attainable by controlling exposure to air would be ~2.700-4,165 K. The resistance also showed a gradual increase over time. However, this was found to be reversible by cross-linking $MoS_2$ QDs with 1,3-benzenedithiol in acetonitrile without affecting the β value.

Dimensions. Unlike ceramic oxide-based thermistors, with chip sizes typically on the order of ~0.5 mm, the inkjet-printed NTC thermistors described herein can be printed with dimensions as low as 40 μm. FIG. 11B shows a photograph of the $MoS_2$ inkjet-printed thermistor, with lateral dimensions of 1.15×2 mm and an average thickness of the combined silver contact and $MoS_2$ QD layers of 400±152 nm, and FIG. 11A shows the height profile of an inkjet-printed thermistor measured by scanning across the dashed area in optical image FIG. 11*b*. The large error is due to the difference in thickness of the printed silver electrodes (304±60 nm) in contrast to the area containing only printed $MoS_2$ QDs (94±55 nm). For comparison, the world's thinnest thermistor has been reported to have a thickness of 70 μm, including electrodes and protective film.

Other Materials. In addition to the devices made with pyridine-capped $MoS_2$ QDs, devices were made with a range of different nanoparticle materials and characterized, as shown in Table 2. Note, except for the as-synthesized $MoS_2$ QDs, all devices were prepared by drop-casting of the nanoparticle ink, rather than inkjet printing.

TABLE 2

Properties of thermistors prepared using nanoparticle materials.

| Material | β (K) | Resistance at 25° C. (Ω) |
|---|---|---|
| $MoS_2$ QDs (as-synthesized prior to pyridine ligand exchange) | 4,135 | 1,000,000,000 |
| $MoS_2$ QDs with NaCl ligands | 3,025 | 300,000 |
| $MoS_2$ 2D QDs | 8,175 | >1,000,000,000,000 |
| $WS_2$ QDs | 4,285 | 300,000,000 |
| $WS_2$ 2D QDs | ~5,000 | 10,000,000,000 |
| $MoSe_2$ QDs | 2,872 | 70,000,000 |
| $WSe_2$ QDs | ~1,850 | 10,000 |
| ZnO nanoparticles | 9,473 | >1,000,000,000,000 |
| cadmium-free quantum dots (CFQD ® quantum dots available from Nanoco Technologies Limited, Manchester, UK) | 15,424 | >1,000,000,000,000 |

The $MoS_2$ 2 D QDs of Table 2 were prepared as follows. $MoS_2$ nanoparticles were first prepared using the following methodology. A vial containing 28 mL octadecane was degassed at 100° C. for 2 h, then backfilled with $N_2$. In a second vial, 4 g hexadecylamine and 4 mL hexadecane were degassed at 100° C. for 2 h. In a third vial, 264 mg $Mo(CO)_6$ was weighed. The contents of the second vial were added to the third vial, using a syringe, followed by heating of the third vial to 130° C. for 1 h. A fourth vial was loaded with 1-dodecanethiol (DDT) and $N_2$ bubbled through. 3 mL DDT was removed using a syringe. The third vial was heated 40° C.

The vial containing octadecane was heated to 30° C. under $N_2$, and the 3 mL DDT was added to the vial at 40° C. At 300° C., the contents of the third vial was swiftly injected, then stirred, and the temperature was increased to 250° C. for 8 minutes, followed by cooling to 60° C.

700 mL acetone was added and the temperature maintained above 20° C., followed by centrifugation. A pale brown supernatant was decanted and discarded, then the solid was rinsed with acetone. 20 mL hexane was used to collect the solid, followed by centrifugation, then the supernatant retained and the solid discarded. The supernatant was filtered through a 3.2 μm syringe filter into a three-neck flask to obtain a solution of the $MoS_2$ nanoparticles.

To form the $MoS_2$ 2 D QDs, A small amount of the nanoparticle solution was dried and sonicated for a few seconds in degassed N-methylpyrrolidone (NMP), followed by stirring for at least two days. The solution was centrifuged and the supernatant, containing the $MoS_2$ 2 D QDs was retained.

The $WS_2$ 2 D QDs of Table 2 were prepared as follows. $WS_2$ nanoparticles were first prepared using the following methodology. 28 mL octadecane was degassed in a round-bottom flask. In a vial, 4 g hexadecylamine (HDA) and 4 mL hexadecane were mixed and degassed at 100° C. In a separate vial, 352 mg W(CO) was weighed, then mixed with 2 mL trioctylphosphine (TOP). A fourth vial was loaded with DDT and $N_2$ bubbled through. The HDA/hexadecane mix was added to the $W(CO)_6$/TOP solution and warmed to 130-140° C. for 10 minutes.

The octadecane was heated to 300° C. The $W(CO)_6$/TOP/HDA/hexadecane was loaded into a syringe along with 0.5 mL DDT. The mixture was rapidly injected into the octadecane solution, followed by growth at 250° C. for 30 minutes.

To isolate, 700 mL acetone was added, followed by centrifugation. The solid ($WS_2$ nanoparticles) was dissolved in toluene to form a solution of $WS_2$ nanoparticles.

To form the $WS_2$ 2 D QDs, a small amount of the nanoparticle solution was dried and sonicated for a few seconds in degassed N-methylpyrrolidone (NMP), followed by stirring for at least two days. The solution was centrifuged and the supernatant, containing the $WS_2$ 2 D QDs was retained.

While the resistance may be affected by device geometry, the β value should not. The β values obtained for $MoS_2$, $MoSe_2$ and $WS_2$ QDs were in the correct range for commercial NTC thermistors. The results suggest that the observed suitability of these QD materials for forming NTC thermistors is unique to these particular TMDC materials, since ZnO nanoparticles and CFQD® quantum dots (available from Nanoco Technologies Limited, UK) did not display β values within the required range. The increase in the β value as the spherical QDs were exfoliated with NMP (for $MoS_2$ and $WS_2$ QDs) is consistent with widening of the band gap, which would support the theory that 2D QDs are formed during the exfoliation process. The β value and resistance also appeared to be sensitive to the nature of the ligands capping the QD surface.

Applications. The inkjet-printed NTC thermistors described herein may be integrated into electrical circuits for circuit protection applications. For example, an inkjet-printed NTC thermistor comprising $MoS_2$ QDs could be connected in series with a capacitor.

Other potential circuit protection applications could include the prevention of overheating in light-emitting diode (LED) devices, as shown in FIG. 12. LED lifetimes can exceed 100,000 hours if operated properly. However, high temperatures can significantly shorten LED lifetime and impair their brightness. While thermistors are already used in combination with other components as temperature protection devices, for example for LEDs (https://passive-components.eu/tdk-technical-guide-how-to-use-temperature-protection-devices-chip-ntc-thermistors/), typically one thermistor would be coupled to an LED array. While this may protect the device from overheating if all the LED chips were to overheat, in the situation where just one LED chip overheats this may not heat the thermistor sufficiently for the thermistor to protect the circuit. If, however, as shown below in FIG. 12, a thermistor was integrated into each LED chip, this would protect the device even if just one LED were to overheat.

The ability to tailor the β value, by changing the QD material type and/or ligands, may be particularly useful for such applications.

Further advantages include that the $MoS_2$ quantum dot material is inkjet printable, offering ease of processing. The current process for manufacturing thermistors based on metal oxides is long and complex (https://www.littelfuse.com/technical-resources/technical-centers/temperature-sensors/thermistor-info/thermistor-manufacturing.aspx). The method of producing inkjet-printed thermistors described herein may offer advantages in terms of providing a higher throughput, less labor intensive process than the manufacturing of conventional NTC thermistors.

In addition, the material may be deposited on flexible substrates, facilitating new applications such as electronic skins and soft robotics. Other potential applications include wearable temperature sensors for continuous monitoring of body temperature, for example in a clinical setting.

The devices are small and can be printed in arrays to enable sensitive temperature mapping over large areas. Allowing for reasonable spacing between devices, a square, inkjet-printed thermistor 250 μm in length would give a thermistor density of 1,600 per $cm^2$.

The β value of the material can be tuned by changing the QD material type and/or ligands, which may expand the range of applications for which the inkjet-printed NTC thermistor can be used.

FIG. 14 is an illustrative schematic of a radio frequency identification (RFID) tag 1400 including NTC thermistor in accordance with various aspects of the disclosure. The RFID tag 1400 comprises an NTC thermistor 1410, made in accordance with various aspects fo the disclosure, electrically coupled with a near field communication (NFC) sensing circuit 1420. The NFC sensing circuit 1420 is electrically coupled with an NFC antenna 1430. FIG. 15 is another illustrative schematic of a RFID tag 1500 including NTC thermistor in accordance with various aspects of the disclosure. The RFID tag 1500 comprises an NTC thermistor 1510, made in accordance with various aspects fo the disclosure, electrically coupled with an NFC sensing circuit 1520. The NFC sensing circuit 1520 is electrically coupled with an NFC antenna 1530.

In some instances, RFID tags 1400 and 1500 can be used as a component in a battery or capacitor for passive thermal management. In some instances, RFID tags 1400 and 1500 can be used as temperatures probes in healthcare and disease tracking. In some instances, RFID tags 1400 and 1500 can be used as be incorporated into biologically acceptable polymers and/or adhesives for use as flexible temperature sensor arrays in soft robotic and electronic skins. In some instances, RFID tags 1400 and 1500 can be used for temperature monitoring applications in printed and/or flexible electronics. In some instances, RFID tags 1400 and 1500 can be used as components in smart packaging applications, such as for the tracking of pharmaceutical or food temperature prior to consumption, or temperature-sensitive fine chemicals.

The foregoing presents particular embodiments embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A negative temperature coefficient (NTC) thermistor comprising:

a substrate comprising:

a base material; and a conductive layer on a surface of the base material; and a layer of transition metal dichalcogenide quantum dots on the conductive layer.

2. The NTC thermistor of claim 1, wherein the transition metal dichalcogenide quantum dots are made of $WO_2$, $WS_2$, $WSe_2$, $WTe_2$, $MnO_2$, $MoO_2$, $MoS_2$, $MoSe_2$, $MoTe_2$, $NiO_2$, $NiTe_2$, $NiSe_2$, $VO_2$, $VS_2$, $VSe_2$, $TaS_2$, $TaSe_2$, $RuO_2$, $RhTe_2$, $PdTe_2$, $HfS_2$, $NbS_2$, $NbSe_2$, $NbTe_2$, $FeS_2$, $TiO_2$, $TiS_2$, $TiSe_2$ or $ZrS_2$.

3. The NTC thermistor of claim 1, wherein the transition metal dichalcogenide quantum dots are made of $WS_2$ or $MoS_2$.

4. The NTC thermistor of claim 1, wherein the base material is flexible.

5. The NTC thermistor of claim 1, wherein the base material is made of a ceramic, silicon or silicon/$SiO_2$.

6. The NTC thermistor of claim 1, wherein the base material is made of a polymer.

7. The NTC thermistor of claim 1, wherein the conductive layer is made of silver.

8. The NTC thermistor of claim 1, wherein the NTC thermistor further comprising a protective coating on at least one surface thereof.

9. The NTC thermistor of claim 1, wherein the transition metal dichalcogenide quantum dots further comprise capping agents.

10. The NTC thermistor of claim 1, wherein the transition metal dichalcogenide quantum dot layer has a thickness ranging from about 10 nm to about 150 nm.

11. The NTC thermistor of claim 1, wherein the transition metal dichalcogenide quantum dot layer has a thickness ranging from about 40 nm to about 150 nm.

12. A radio frequency identification (RFID) tag comprising an NTC thermistor according to claim 1.

13. The RFID tag of claim 12, wherein the RFID tag is flexible.

14. A light-emitting diode (LED) device comprising an NTC thermistor according to claim 1.

15. An electrical circuit comprising an NTC thermistor according to claim 1 connected in series with a capacitor.

16. The NTC thermistor of claim 1, wherein the transition metal dichalcogenide quantum dots are made of $WSe_2$ or $MoSe_2$.

17. The NTC thermistor of claim 1, further comprising a protective coating or an encapsulant.

* * * * *